(12) United States Patent
Schneider et al.

(10) Patent No.: US 9,266,636 B2
(45) Date of Patent: Feb. 23, 2016

(54) HORIZONTAL TRANSVERSE SEALING UNIT

(71) Applicant: Robert Bosch GmbH, Stuttgart (DE)

(72) Inventors: Hauke Schneider, Lottstetten (DE); Peter Blanz, Neuhausen (CH); Tobias Bechtel, Beringen (CH); Rolf Steinemann, Neuhausen (CH); Alfred Wipf, Jestetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/385,217

(22) PCT Filed: Feb. 18, 2013

(86) PCT No.: PCT/EP2013/053207
§ 371 (c)(1),
(2) Date: Sep. 15, 2014

(87) PCT Pub. No.: WO2013/135459
PCT Pub. Date: Sep. 19, 2013

(65) Prior Publication Data
US 2015/0047296 A1 Feb. 19, 2015

(30) Foreign Application Priority Data
Mar. 16, 2012 (DE) .......................... 10 2012 204 196

(51) Int. Cl.
*B32B 37/00* (2006.01)
*B65B 51/30* (2006.01)
(Continued)

(52) U.S. Cl.
CPC ............... *B65B 51/306* (2013.01); *B29C 65/02* (2013.01); *B29C 65/4825* (2013.01);
(Continued)

(58) Field of Classification Search
CPC .............. B29C 65/743; B29C 66/4312; B29C 66/8222; B29C 66/83513; B29C 66/849; B29C 66/93451

USPC .............. 156/553, 555, 580, 581, 582, 583.1, 156/583.4
See application file for complete search history.

(56) References Cited

U.S. PATENT DOCUMENTS

| 4,949,846 A | 8/1990 | Lakey |
| 5,345,750 A | 9/1994 | Gries et al. |

(Continued)

FOREIGN PATENT DOCUMENTS

| DE | 29822122 | 4/2000 |
| DE | 10341450 | 3/2005 |
| GB | 2262079 | 6/1993 |

OTHER PUBLICATIONS

International Search Report for Application No. PCT/EP2013/053207 dated May 27, 2014 (English Translation, 2 pages).

*Primary Examiner* — James Sells
(74) *Attorney, Agent, or Firm* — Michael Best & Friedrich LLP

(57) ABSTRACT

The invention relates to a horizontal transverse sealing unit, in particular for a horizontal tubular bag machine for sealing at least one tubular film around at least one object to be packaged, having a first and a second rotational axis (18a, 20a) which are parallel to each other and at least two sealing jaw pairs (26a, 28a and 30a, 32a) which are each formed by at least one sealing jaw (26a, 30a) rotating around the first rotation axis (18a) and at least one sealing jaw (28a, 32a) rotating around the second rotation axis (20a), such that, during a sealing process, the sealing jaws (26a, 28a) of a sealing jaw pair (26a, 28a) approach each other and material layers can be sealed between the sealing jaws (26a, 28a) under exertion of pressure. According to the invention, at least two independently drivable sealing drives of the horizontal transverse sealing unit are provided to drive at least two sealing jaw pairs (pair 26a, 28a and pair 30a, 32a) independently of each other.

16 Claims, 5 Drawing Sheets

(51) Int. Cl.
  *B29C 65/74* (2006.01)
  *B29C 65/00* (2006.01)
  *B29C 65/02* (2006.01)
  *B65B 9/067* (2012.01)
  *B65B 65/02* (2006.01)
  *B29C 65/08* (2006.01)
  *B29C 65/18* (2006.01)
  *B65B 51/22* (2006.01)
  *B29C 65/48* (2006.01)

(52) U.S. Cl.
  CPC .......... *B29C 65/743* (2013.01); *B29C 66/1122* (2013.01); *B29C 66/4312* (2013.01); *B29C 66/8222* (2013.01); *B29C 66/83513* (2013.01); *B29C 66/849* (2013.01); *B29C 66/8412* (2013.01); *B29C 66/93441* (2013.01); *B29C 66/93451* (2013.01); *B65B 9/067* (2013.01); *B65B 65/02* (2013.01); *B29C 65/087* (2013.01); *B29C 65/18* (2013.01); *B29C 65/4815* (2013.01); *B29C 65/7443* (2013.01); *B29C 66/133* (2013.01); *B29C 66/4322* (2013.01); *B29C 66/723* (2013.01); *B29C 66/83413* (2013.01); *B65B 51/225* (2013.01)

(56) References Cited

U.S. PATENT DOCUMENTS

| | | | | |
|---|---|---|---|---|
| 5,351,464 | A | * | 10/1994 | Francioni ........................ 53/450 |
| 5,548,946 | A | | 8/1996 | Holub |
| 8,919,411 | B2 | * | 12/2014 | Ippers et al. ................ 156/580.2 |
| 9,056,427 | B2 | * | 6/2015 | Vogler .................... 1/1 |
| 2003/0126840 | A1 | * | 7/2003 | Helwig et al. .................. 53/551 |
| 2004/0011452 | A1 | * | 1/2004 | Capodieci .................... 156/73.3 |
| 2012/0073762 | A1 | * | 3/2012 | Ippers et al. ................ 156/580.1 |
| 2012/0111475 | A1 | * | 5/2012 | Ippers et al. ................ 156/73.1 |

* cited by examiner

HORIZONTAL TRANSVERSE SEALING UNIT

BACKGROUND OF THE INVENTION

The prior art already discloses horizontal transverse sealing units for horizontal tubular bag machines for sealing at least one tubular film around at least one object to be packaged, having a first and a second rotational axis which are parallel to each other and at least two sealing jaw pairs which are each formed by at least one sealing jaw rotating around the first rotational axis and at least one sealing jaw rotating around the second rotational axis, such that, during a sealing process, the sealing jaws of a sealing jaw pair approach each other and material layers can be sealed between the sealing jaws under the exertion of pressure. A sealing drive drives the sealing jaws synchronously. During sealing processes, the sealing jaws are moved at a packaging speed synchronized with the tubular film. During periods of time between the sealing processes, the sealing jaws can be accelerated and/or decelerated by means of a limping movement (an irregular movement). A deviation in the lengths of packages to be formed from a path length, along which the sealing jaws are moved, can thus be compensated. In the case of a common sealing drive which synchronously drives all of the sealing jaws, the limping movement can only take place during the time period in which no sealing jaw is carrying out a sealing process. The resulting short time period that is available for the limping movement causes high acceleration rates and/or a reduced efficiency of the horizontal transverse sealing unit. Deviations in the package lengths from a package length adapted to the path length of the sealing jaws are only possible to a limited extent.

SUMMARY OF THE INVENTION

The invention relates to a horizontal transverse sealing unit, in particular for a horizontal tubular bag machine, for sealing at least one tubular film around at least one object to be packaged, having a first and a second rotational axis which are parallel to each other and at least two sealing jaw pairs which are each formed by at least one sealing jaw rotating around the first rotational axis and at least one sealing jaw rotating around the second rotational axis, such that, during a sealing process, the sealing jaws of a sealing jaw pair approach each other and material layers can be sealed between the sealing jaws under exertion of pressure.

According to the invention, at least two independently drivable sealing drives of the horizontal transverse sealing unit are provided to drive at least two sealing jaw pairs independently of each other. A "horizontal tubular bag machine" is particularly to be understood in this context as a packaging machine known to the person skilled in the art as a HFFS, "horizontal form fill & seal", packaging machine which is provided to form at least one tubular film from a material web around one or a plurality of objects to be packaged and to seal said tubular film at both ends. Objects to be packaged and the tubular film formed around the objects are moved at least substantially in a horizontal packaging direction while forming the tube, introducing the objects to be packaged into the tubular film and sealing the tube. "At least substantially horizontal" is particularly to be understood in this context as a direction which deviates less than 60 degrees, preferably less than 45 degrees, and very preferably less than 20 degrees from a horizontal disposed perpendicularly to a weight force. The objects to be packaged preferably lie on a feeder carrier during a feeding movement. The material web is preferably formed to a tubular film around the objects to be packaged. The tubular film is preferably sealed by a longitudinal sealing unit that is disposed in the packaging direction upstream of the horizontal transverse sealing unit. In order to seal the tube, the longitudinal sealing unit connects the two outer edges of the material web that are disposed parallel to the packaging direction of the material web preferably in an overlapping manner ("lap seal"), wherein an outer face of a material web edge is connected to an inner face of the other material web edge. In a particularly preferred manner, the longitudinal sealing unit connects the outer edges of the material web using a fin seam ("fin seal"), wherein the inner faces of the material web edges are placed on top of each other and connected. The longitudinal sealing unit preferably connects two material layers of the material web. A "material layer" is particularly to be understood in this context as a layer of the material web, wherein a material layer can have a plurality of layers, such as a carrier layer and a sealing layer. The longitudinal sealing unit preferably contains one or a plurality of sealing devices, e.g. sealing roller pairs and/or sealing jaws, which connect the outer edges under exertion of pressure and/or application of heat to the material web layers. Objects to be packaged are preferably inserted into the tubular film using suitable means, such as a feeder chain comprising drivers, which push the objects in the packaging direction. A "horizontal transverse sealing unit" is particularly to be understood in this context as a unit which is provided for sealing the tubular film in the packaging direction in front of and behind objects to be packaged. It is also possible that a plurality of tubular films is formed next to each other in the packaging direction from one or a plurality of material webs. This is especially the case for multi-web packaging machines, in which objects to be packaged are delivered on a plurality of webs disposed next to each other in the packaging direction. The horizontal tubular bag machine can in this case form a tubular film around objects to be packaged for each web and seal said tubular films along the packaging direction using longitudinal sealing units. The tubular films can be transported side by side through the horizontal transverse sealing unit. The horizontal transverse sealing unit seals the tubular films in front of and behind the objects to be packaged preferably in a common sealing process. The horizontal transverse sealing unit preferably seals the tubular film with a transverse sealing seam which is disposed at least substantially transverse to the packaging direction. "Transverse" refers in this context particularly to a direction that deviates less than 45 degrees, preferably less than 20 degrees and very preferably less than 10 degrees from a perpendicular to the packaging direction. The sealing seam is preferably at least substantially horizontally disposed. In a particularly preferable manner, the horizontal transverse sealing unit simultaneously seals an end of the package which is at the rear in the packaging direction as well as an end of the succeeding package which is at the front in the packaging direction during one sealing process. In the same procedural step, the horizontal transverse sealing unit separates in a very preferably manner the tubular film forming the packages and thus the successive packages. The horizontal transverse sealing unit seals the tubular film by the sealing jaws pressing together the material layers of opposite sides of said tubular film. The material layers can preferably comprise sealing layers which promote a joining of the material layers. The sealing layers can have, in particular, a layer which particularly forms a connection to the further sealing layer under exertion of pressure, such as a contact adhesive. The sealing jaws can be heated and besides pressure give off heat to the material layers. The sealing layers can comprise a layer which, particularly when heated at a low temperature, melts as an outer face of the material web and forms a connection to the further sealing layer. A polymer having a low melting temperature is particularly suitable as the outer face and/or carrier layer of the material web. The sealing layers can fuse and thus connect to one another. A melting of the outer face of the material web when in contact with the sealing jaws can be prevented. The person skilled in the art is familiar with other methods which promote a sealing of the material layers, such as, for example, subjecting the sealing jaws to high frequency oscillations (ultrasonic sealing). A "sealing jaw pair" is particularly to be understood in this context as sealing jaws that are provided to jointly approach the tubular film from opposite sides of the material layers of said tubular film and seal the same. "Rotating around a rotational axis" refers particularly in this context to the fact that the sealing jaws are moved in a closed path around the rotational axis. The closed path is preferably located at least substantially in a plane that is perpendicular to the rotational axis. "At least substantially" refers particularly in this context to the fact that an area spanned by the path in a direction perpendicular to the rotational axis has an extension of less than 25%, preferably of less than 10% and very preferably of less than 5% of the largest possible path diameter. The sealing jaws preferably rotate around the rotational axis, at least in part, in an elliptical path. In a very preferable manner, the sealing jaws rotate around the rotational axis, at least in part, in a circular path. "At least in part" refers in this context particularly to the fact that at least ⅔, preferably ¾ and very preferably the entire closed path around the rotational axis follows at least substantially an elliptical path or, respectively, a circular path. "At least substantially" is particularly to be understood in this context as a deviation of less than 10%, preferably of less than 5% and very preferably of less than 1% from the diameter of the elliptical path or, respectively, the circular path. The rotational axes are preferably disposed substantially perpendicular to the packaging direction, parallel to the horizontal and at least substantially parallel to the direction of the transverse sealing seams formed by the horizontal transverse sealing unit. The rotational axes of a sealing jaw pair are preferably disposed at least substantially in a plane perpendicular to the packaging direction. "At least substantially" is particularly to be understood in this context as a deviation of less than 10 degrees, preferably of less than 5 degrees and very preferably of less than 1 degree. A sealing jaw of the sealing jaw pair preferably contains a crush blade and a further sealing jaw of the sealing jaw pair a counter holder. The tubular film can be severed between the crush blade and the counter holder. A "sealing drive" is particularly to be understood as a device that is provided to move at least one sealing jaw in the closed path around the rotational axes. The sealing drive is preferably provided to move the sealing jaws of at least one sealing jaw pair around the rotational axes thereof. The sealing drive can contain means for movably mounting the sealing jaws along the path. The sealing drive can contain a transmission unit. Sealing drives can be driven by a common drive. An adjusting unit can be provided for driving the drive units of at least two sealing jaw pairs independently of one another. The adjusting unit can, for example, be formed from a transmission comprising an adjustable and/or variable gear ratio and transmit a drive movement of the drive comprising an adjustable gear ratio to the sealing drives. "To drive independently of each other" particularly refers in this context to the fact that the sealing drives can adjust a position around the rotational axes as well as a speed and acceleration of a sealing jaw or a sealing jaw pair in an admissible range independently of the position, speed and acceleration of at least one further sealing jaw or a sealing jaw pair. "Positions in an admissible range" are particularly to be understood in this context as positions of a sealing jaw or sealing jaw pair which prevent a collision of the sealing jaw or the sealing jaw pair with the at least one further sealing jaw or a further sealing jaw pair. The admissible range can particularly be defined by admissible adjustment angles, based on a basic angle, between adjacent sealing jaws having a common rotational axis. A sealing jaw pair can be moved advantageously during a sealing process at a packaging speed synchronized with the tubular film. A relative motion of the sealing jaw pair in the direction of movement of the tubular film can be reduced and/or prevented. A sealing quality can be increased. A sealing drive can advantageously move a sealing jaw pair after a sealing process around the rotational axes, such that said sealing jaw pair, after the tubular film has been further moved by one or a plurality of package lengths, can form the next transverse sealing seam on the tubular film. Package length and path length of the sealing jaws around the rotational axes can deviate from one another. The sealing jaws can be moved along the path correspondingly in part faster and/or slower than a packaging speed in the packaging direction. This speed compensation is known to the person skilled in the art as a "limping movement". The path of the sealing jaws around the rotational axis is provided for the limping movement of the sealing jaw pair, in which path all of the sealing jaw pairs driven by a common drive are free of contact with the tubular film. If, on the other hand, all of the sealing jaw pairs are driven by a common drive, a limping movement can only take place during the path stages in which all of the sealing jaw pairs are free from contact with the tubular film. A short time window for the limping movement is available. If at least two sealing jaw pairs are driven independently, an advantageously longer time window is available for the limping movement. Each sealing jaw pair is preferably driven by its own drive. The time window which is available for the limping movement can be particularly long. Acceleration rates during the limping movement can be lower. Deviations in the path length from the package length can be greater. A packaging speed can be increased. In a further, advantageous embodiment of the invention, the sealing drives can be provided for driving each of the sealing jaws independently of each other. Respectively one sealing drive for the independent drive of a sealing jaw is preferably provided. Sealing drives of a sealing jaw pair can preferably be driven in a synchronized manner at least during a sealing process. A sealing drive can comprise, in particular, a primary part or secondary part of a linear motor. The sealing jaw can preferably be connected to the sealing drive in a form-fitting and/or force-fitting manner. A particularly flexible optimization of the limping movement can thus be possible. A movement of each sealing jaw can be optimized independently of further sealing jaws at least to a great extent. A synchronous movement of sealing jaws with a further sealing jaw of a sealing jaw pair can be limited to the duration of a sealing process.

According to the invention, the sealing drives furthermore have in each case a sealing shaft rotating around the first rotational axis and around the second rotational axis, on which shafts at least one sealing jaw of at least one sealing jaw pair is disposed in each case. The term "disposed" is particularly to be understood in this context as mounted. The sealing jaws can particularly be connected to the sealing shafts in a force-fitting manner and/or preferably in a form-fitting manner. A particularly compact and rigid mounting of the sealing jaws can thus be achieved. Particularly high rotational speeds can be possible at which the sealing jaws are moved around the rotational axis, in particular at more than 100 revolutions/minute, preferably more than 250 revolutions/minute and very preferably more than 500 revolutions/minute. Spring and/or damping elements can be provided between sealing shafts and sealing jaws. The spring and/or damping elements can be provided for compensating tolerances and/or thicknesses of the material layers of the tubular film and/or to generate a sealing pressure by deflecting during contact of the sealing jaws. The sealing jaws can be guided very reliably along a path by means of the sealing shafts. A sealing drive preferably jointly drives the sealing shafts of a sealing jaw pair. A transmission and/or a toothed belt can particularly transmit the drive movement between the sealing shafts of a sealing jaw pair. The sealing jaws of a sealing jaw pair can advantageously be moved synchronously. It can thus be ensured that the sealing jaws of a sealing jaw pair approach each other in order to form a transverse sealing seam. The sealing jaws can be moved especially advantageously in a circular path around the rotational axes. The rotational axes can preferably be displaceably disposed in a direction perpendicular to the packaging direction and perpendicular to the horizontal. The rotational axes of a sealing jaw pair can be spaced apart from one another in an initial position at a distance which is less than twice the radius of a circular path in which the sealing jaw pairs move around the rotational axes. If the sealing jaws approach one another up to a material layer thickness of the tubular film, the distance between the rotational axes can be lengthened to such an extent that the sealing jaws exert a pressure on the material layers; however, a collision of the sealing jaws is prevented. A distance along the path of the sealing jaw pairs, along which the sealing jaw pair exerts a pressure on the material layers of the tubular film, can be lengthened. In so doing, a sealing time can advantageously be lengthened.

The invention furthermore proposes a control unit which is provided to optimize a movement profile of the sealing drives. A "control unit" is particularly to be understood in this context as a motor control unit which controls the drive motors of the sealing drives in an open-loop or closed-loop manner. The control unit can optimize a movement profile of the sealing drives, in particular during the limping movement, by a time span which is as long as possible being used for the limping movement. A "movement profile" of a sealing drive is particularly to be understood in this context as an acceleration and speed behavior during a revolution of the sealing jaws driven by the sealing drive. The movement profile can comprise particularly small acceleration maxima. A limping movement can advantageously take place at least during a large part of the path of a sealing jaw around the rotational axis in which said sealing jaw is free of contact with the tubular film. A "large part" is to be understood in this context as more than 50%, preferably more than 70% and very preferably more than 90% of the path length in which the sealing jaw is free of contact with the tubular film. The limping movement can preferably be carried out during more than half of the path of a sealing jaw around the rotational axis, in a particularly preferable manner during more than ⅔ of the path. As a result, a difference between the package length and the path length of the sealing jaws around the rotational axes can be particularly effectively compensated. A driving power can thus be reduced. An energy consumption of the sealing drives can accordingly be reduced. Hence, a service life of the sealing drives can be increased. Noise and other vibrations can be reduced. A packaging speed can be increased. More than 200 packages per minute, preferably more than 600 packages per minute and very preferably more than 1,200 packages per minute can be formed from a tubular film fed in the packaging direction. A replacement of the transverse sealing unit by a transverse sealing unit adapted to the package length can thereby be avoided. The control unit can optimize the movement profile of the sealing drives as a function of a variable package length. Successive objects to be packaged can have varying lengths. A package length can be adapted to the length of the objects to be packaged. The material web can contain markings which specify the package length. Successive package lengths can be different from one another. A device can be provided for detecting the length of the objects to be packaged and/or the package length specified by markings on the material web. The control unit can optimize the movement profile of the sealing drives, such that packages having the desired length are formed. The control unit can particularly accelerate and/or decelerate the sealing jaws during the limping movement, such that the next transverse sealing seam is formed according to a desired, variable package length.

According to the invention, two sealing drives are furthermore disposed opposite one another in the direction of the common rotational axes. A particularly effective, space-saving arrangement can thereby be achieved. Two sealing drives can very easily comprise independently driven sealing shafts having a common rotational axis.

The invention further proposes at least one support shaft, with which the sealing shafts having a common rotational axis are mutually supported. A "support shaft" is particularly to be understood in this context as a shaft which is connected to sealing shafts having a common rotational axis. The support shaft can be a constituent part of one of the sealing shafts. The support shaft is preferably rotatably mounted at least in further sealing shafts. The sealing shafts can advantageously be independently driven. The support shaft can particularly support transverse forces and/or bending moments between the sealing shafts. A rigidity of the mounting of the sealing shafts can thereby be increased particularly when a loading with transverse forces occurs. A deflection of the sealing shafts can thus be reduced. The sealing shafts and/or the sealing jaws can thereby be more precisely mounted.

According to the invention, at least one sealing shaft of a sealing jaw pair furthermore has at least one support region, on which at least one sealing jaw of a further sealing jaw pair having a common rotational axis is supported. The support region can, in particular, be designed as a bearing surface, preferably as a rotationally symmetrical bearing surface, very preferably as a cylindrical bearing surface. The sealing jaw of the further sealing jaw pair preferably comprises a bearing surface having a geometry that is adapted to the support region. The support region can particularly be provided for receiving a compressive force from the sealing jaw of the further sealing jaw pair. An exertion of a pressure on the material layers to be sealed and/or a pressure exerted on the sealing jaw when severing the tubular film with the aid of a crush blade can be particularly well supported. A deflection of the sealing jaw and/or the sealing shaft of the further sealing jaw pair can be reduced during a sealing process. The sealing jaws can thus be particularly rigidly mounted.

The invention furthermore proposes at least one support unit which is provided to, at least in part, bridge a gap between sealing jaws which have a common rotational axis and lie adjacent to one another in a rotational direction. A "gap" is to be understood in this context as a surface relating to a depression between the sealing jaws in the direction of the common rotational axis and as a surface relating to a surface that is swept by the sealing surfaces of the sealing jaws. "At least in part bridge" refers particularly in this context to the fact that the support unit at least reduces a depth of the depression at least in sub-regions of the gap. A support unit can particularly be disposed at least between the sealing jaws, which move about a rotational axis disposed beneath the tubular film in the direction of a gravitational force. A "sagging" of the tubular film into the gap between the sealing jaws can advantageously be prevented or reduced. A packaging quality can thereby be achieved. In particular, even heavy objects to be packaged can be carried in the tubular film by means of the horizontal transverse sealing unit.

According to a preferred embodiment of the invention, the support unit comprises at least two support combs that mesh with one another and are mounted to the adjacent sealing jaws. A "support comb" is particularly to be understood as a planar component which has comb-like teeth on a side thereof that faces away from the sealing jaw. The teeth are disposed offset with respect to teeth of the oppositely lying support comb of the adjacent sealing jaw such that the teeth can mesh with one another when the two sealing jaws approach each other. The teeth preferably mesh with each other in a contact-less manner. A shape of the surface that is spanned by the support comb is preferably adapted to the surface which the sealing surfaces of the sealing jaws sweep during a movement thereof. If the sealing surfaces move along a circular path and thus sweep a hollow cylindrical surface, the support combs preferably form sections of a cylindrical surface. With respect to the sealing surfaces, the support combs can be offset somewhat rearwards in the direction of the rotational axis and/or comprise a cylindrical surface having a somewhat smaller radius than the distance of the sealing surfaces to the rotational axis. The support unit can be simply and effectively designed to comprise support combs. A support function can thus be ensured. The sealing jaws having independent drives can also be driven independently when having a support unit disposed on said sealing jaws. An admissible range in which the sealing jaws can be independently moved can thereby be large.

The invention further proposes a counterweight which compensates at least in part for the centrifugal forces of a sealing jaw disposed on a sealing shaft. "Compensates at least in part" refers in this context particularly to the fact that, with regard to the rotational axes, at least transverse forces, which are brought about by the rotation of the sealing jaws around the rotational axes, are compensated at least to a large extent. The counterweight is preferably disposed on the sealing shaft. "At least to a large extent" is to be understood in this context as at least to 75%, preferably at least to 85% and very preferably at least to 95%. Vibrations can therefore be reduced. A running smoothness of the horizontal transverse sealing unit can be increased. A service life can be extended.

The invention further proposes a horizontal tubular bag machine comprising a horizontal transverse sealing unit. The horizontal tubular bag machine can have the aforementioned advantages of the horizontal transverse sealing unit. Said horizontal tubular bag machine can, in particular, produce tubular bags having different package lengths and packaging heights at a high output capacity. The horizontal transverse sealing unit can compensate for the package lengths without any modifications by means of an advantageous limping movement having comparatively low acceleration rates. The tubular film comprising objects to be packaged can be carried through the horizontal transverse sealing unit comprising the support unit using the feeder carrier, wherein a sagging of the tubular film can be prevented. A high packaging quality and a high degree of reliability can thus be ensured.

BRIEF DESCRIPTION OF THE DRAWINGS

Further advantages ensue from the following description of the drawings. Four exemplary embodiments of the invention are depicted in the drawings. The drawings, the description and the claims contain numerous features in combination. The person skilled in the art will also expediently consider the features in isolation and put them together to form further useful combinations.

In the drawings.

DETAILED DESCRIPTION

Figure 8:
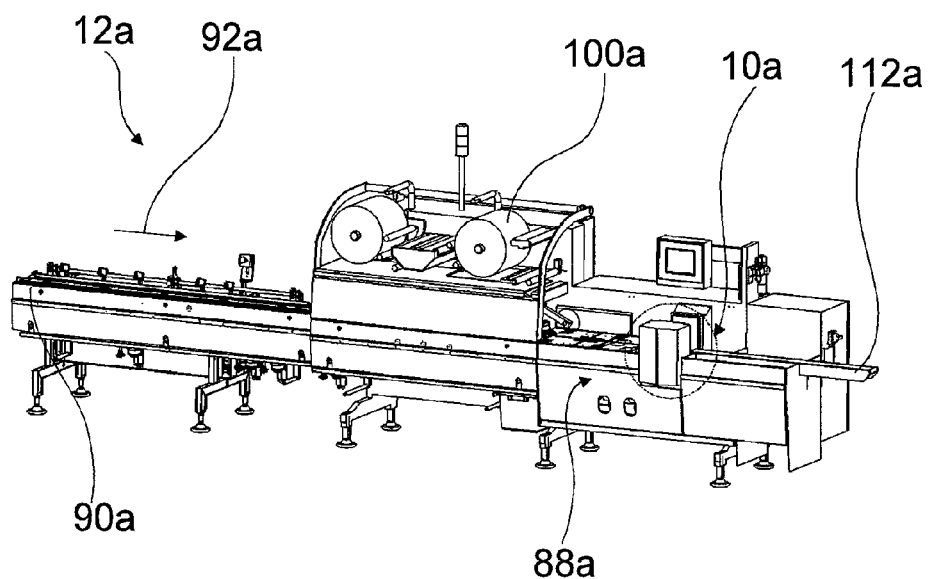
FIG. 8 shows a schematic depiction of a horizontal tubular bag machine.

FIG. 8 shows a horizontal tubular bag machine 12a comprising a sealing unit 88a. Objects to be packaged 16a (FIG. 1) are delivered in a single lane on a feeder carrier 90a in a horizontal packaging direction 92a by means of drivers 94a of a feeder chain 96a to the sealing unit 88a. A material web 98a is rolled off from a packaging material roll 100a and supplied to the sealing unit 88a. From the material web 98a, a tubular film 14a around objects 16a that are supplied in the packaging direction 92a to the sealing unit 88a is formed around a forming shoulder 102a which is only schematically depicted here. The tubular film 14a is sealed below the objects 16a by a horizontal longitudinal sealing unit 104a along a longitudinal sealing seam 106a in the packaging direction 92a. This is followed by a horizontal transverse sealing unit 10a which seals the tubular film 14a around the objects 16a to be packaged along transverse sealing seams 108a and thus forms sealed packages 110a comprising objects 16a and severs the same from the tubular film 14a. At the same time, the horizontal transverse sealing unit 10a thereby forms in each case the second transverse sealing seam 108a of a package 110a leaving the horizontal transverse sealing unit 10a, said second transverse sealing seam being made against the packaging direction 92a, as well as the first sealing seam 108a of the succeeding package 110a entering into the horizontal transverse sealing unit 10a, said first sealing seam being likewise made against the packaging direction 92a. In the same step, the horizontal transverse sealing unit 10a severs the tubular film 14a between the transverse sealing seams 108a of the two packages 110a and therefore separates said two packages 110a. Said packages 110a are transported on an outfeed conveyor 112a away from the sealing unit 88a.

Figure 1:
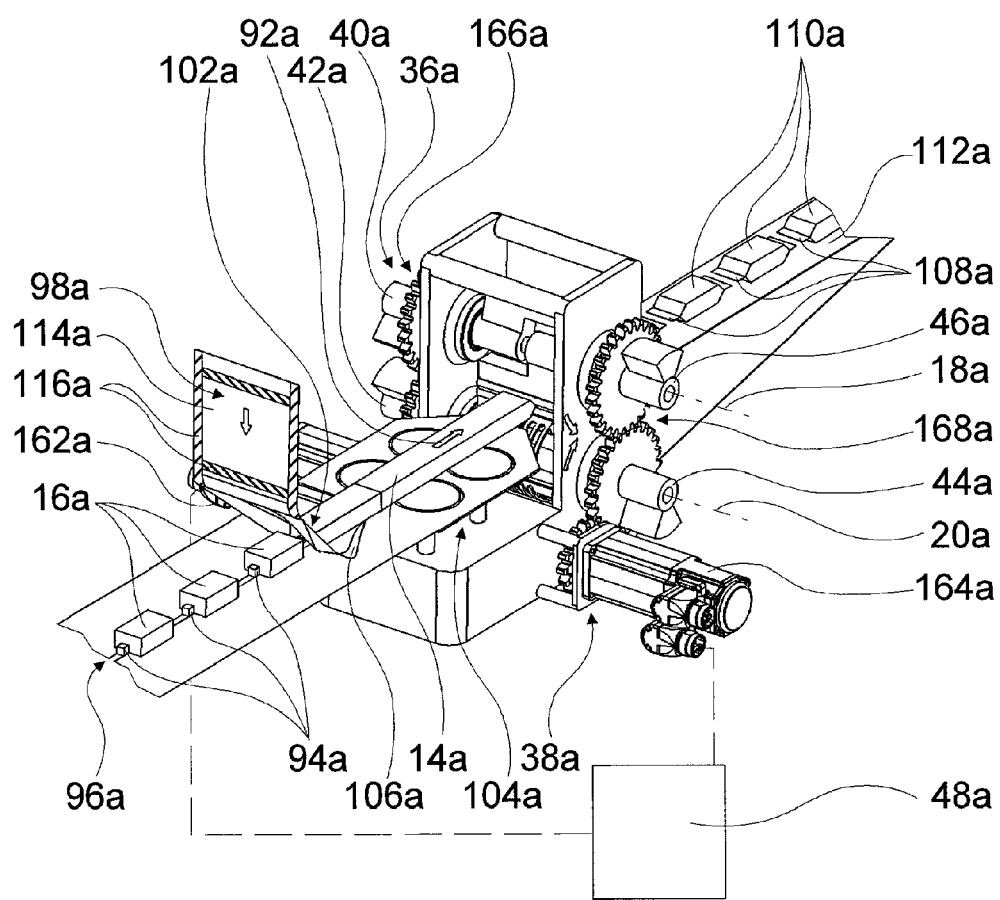
FIG. 1 shows a schematic depiction of a sealing unit comprising a horizontal transverse sealing unit.
Figure 2:
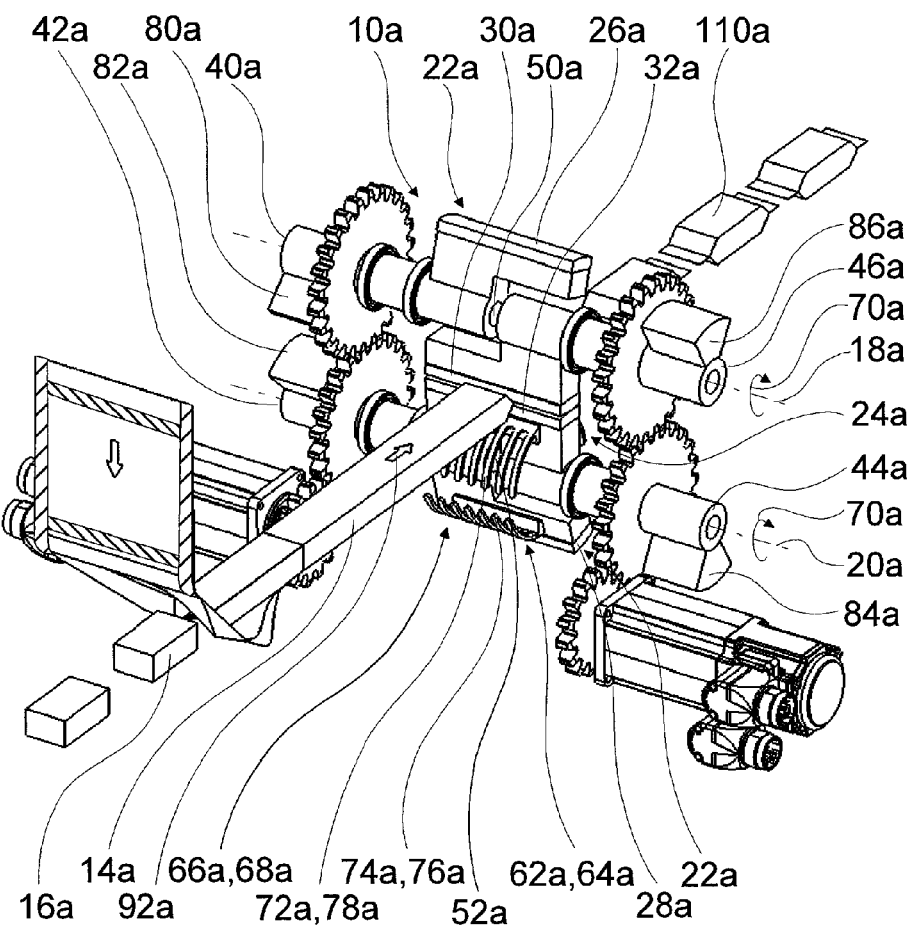
FIG. 2 shows a schematic depiction of parts of the horizontal transverse sealing unit.

FIG. 1 and FIG. 2 show the horizontal transverse sealing unit 10a for sealing the tubular film 14a around the objects 16a to be packaged, comprising a first and a second rotational axis 18a, 20a that are parallel to one another. Two sealing jaw pairs 22a, 24a are formed from respectively one sealing jaw 26a, 30a rotating around the first rotational axis 18a and respectively one sealing jaw 28a, 32a rotating around the second rotational axis 20a. During a sealing process, the sealing jaws 26a, 28a and the sealing jaws 30a, 32a of a first sealing jaw pair 22a and a second sealing jaw pair 24a alternately approach each other. Material layers 34a of the material web 98a are sealed between the sealing jaws 26a, 28a and the sealing jaws 30a, 32a under exertion of pressure when said jaws approach each other. The material web 98a has a sealing layer 116a on the inner face 114a thereof that faces the objects 16a to be packaged, said sealing layer forms under pressure the transverse sealing seam 108a with the sealing layer 116a of the inner face 114a of the material web 98a which lies opposite thereto when forming the tubular film 14a. The sealing jaws 26a, 28a, 30a, 32a can additionally be heated in order to support the forming of sealing seams by fusing the sealing layer 116a. Two sealing drives 36a, 38a which can be independently driven are provided for driving the two sealing jaw pairs 22a, 24a independently of one another. The sealing drive 36a comprises a sealing shaft 40a that rotates around the first rotational axis 18a and a sealing shaft 42a that rotates around the second rotational axis 20a of the first sealing jaw pair 22a. The sealing drive 38 correspondingly comprises sealing shafts 44, 46 of the second sealing jaw pair 24a which rotate around the rotational axes 18a, 20a. The sealing jaw 26a is disposed on the sealing shaft 40a, the sealing jaw 28a on the sealing shaft 42a, the sealing jaw 32a on the sealing shaft 44a and the sealing jaw 30a on the sealing shaft 46a. The two sealing drives 36a, 38a each comprise a motor 162a, 164a as well as a transmission 166a, 168a. The motor 162a jointly drives the two sealing shafts 40a, 42a of the sealing jaw pair 22a via the transmission 166a. The motor 164a jointly drives the two sealing shafts 44a and 46a of the sealing jaw pair 24a via the transmission 168a. In an alternative embodiment, it would also be conceivable for each sealing shaft 40a, 42a, 44a, 46a to have its own motor at its disposal and for the motors of a sealing jaw pair 22a, 24a to be synchronously driven by an electrical control unit. The transmissions 166a, 168a could then be omitted. The sealing shafts 40a, 42a, 44a, 46a having a common rotational axis 18a, 20a mutually support one another in each case with a support shaft 50a, 52a. The support shafts 50a, 52a are rotatably mounted in the respective sealing shafts 40a, 42a, 44a, 46a, which are supported by them. Four counterweights 80a, 82a, 84a, 86a compensate in part for centrifugal forces of the sealing jaws 26a, 28a, 30a, 32a disposed on the sealing shafts 40a, 42a, 44a, 46a. The sealing jaws 26a, 28a, 30a, 32a particularly compensate transverse forces occurring due to the centrifugal forces. Two support units 62a, 64a are provided for bridging a gap 66a, 68a between sealing jaws 28a, 32a that lie adjacent to one another in a rotational direction 70a and have a common rotational axis 20a. The support units 62a, 64a each comprise two support combs 72a, 74a, 76a, 78a which mesh with one another and are mounted to the adjacent sealing jaws 28a, 32a. The reference signs of the support combs 76a, 78a which are partially or completely covered in FIG. 2 as well those of the support unit 64a and the gap 68a refer in FIG. 2, for the sake of clarity, to the corresponding support combs 72a, 74, the support unit 62a and to the gap 66a. The support units 62a, 64a prevent the tubular film 14a comprising the objects 16a to be packed from sagging between the sealing jaws 28a, 32am, which could impair the packaging quality.

Figure 3:
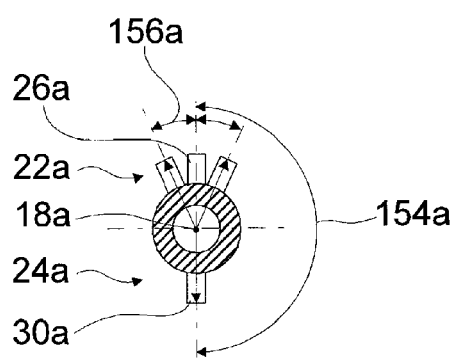
FIG. 3 shows a schematic depiction of basic angles and adjustment angles of two sealing jaws of two sealing jaw pairs.

In FIG. 3, the basic angle 154a and the adjustment angle 156a of two sealing jaws 26a, 30a of two sealing jaw pairs 22a, 24a are depicted in a simplified manner. In one basic position, the sealing jaws 26a, 30a are disposed opposite one another around the rotational axis 18a at a basic angle of 180 degrees. In the example of the sealing jaw 26a, an adjustment angle 156a is depicted about which the sealing jaw 30a can be adjusted with respect to the sealing jaw 26a. The sealing jaws 28a, 32a, which are disposed around the rotational axis 20a are correspondingly adjusted. The adjustment angle 156a is maximally selected such that the sealing jaws 26a, 30a as well as 28a, 32a as well as the support combs 72a, 74a, 76a, 78a, which are not depicted in this diagram, can remain collision-free. The sealing jaws 26a, 30a as well as 28a, 32a of the two sealing jaw pairs 22a, 24a can be independently driven within the aforementioned range of the adjustment angle 156a.

Figure 4:
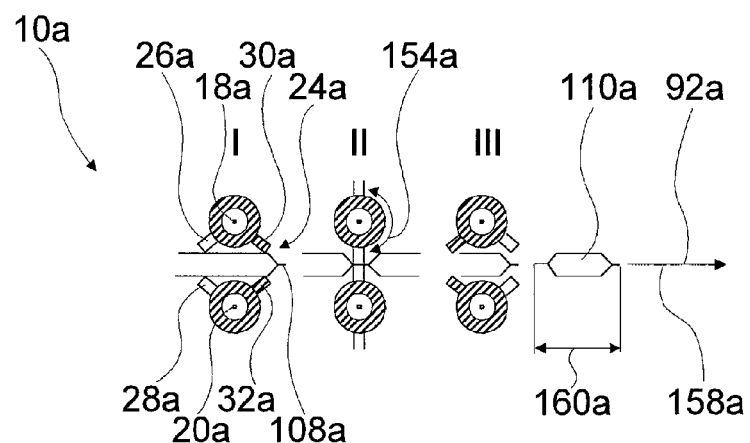
FIG. 4 shows a schematic depiction of a transverse sealing process.

Again in a simplified manner and without depiction of the support units 62a, 64a, FIG. 4 schematically depicts the movement of the sealing jaws 26a, 28a, 30a, 32a during three process steps I, II, III, during production of packages 110a. In a first process step I, the sealing jaws 26a and 28a of the sealing jaw pair 22a are synchronized with a packaging speed 158a in a packaging direction 92a in order to produce a transverse sealing seam 108a. The sealing jaws 30a, 32a of the sealing jaw pair 24a have completed the production of a transverse sealing seam 108a and are accelerated around the rotational axes 18a, 20a so that they, after the tubular film 14a has moved around a further package length 160a, can produce the next transverse sealing seam 108a. In the example shown, a package length 160a is shorter than the path along the circumference around the rotational axes 18a, 20a, along which path the sealing jaws 26a, 28a, 30a, 32a are moved, so that the sealing jaws 30a, 32a have to be accelerated with respect to the packaging speed 158a in order to cover said path in the time in which the tubular film 14a is moved further by a packaging length 160a. In the process step II, the sealing jaws 30a, 32a have caught up with respect to the sealing jaws 26a, 28a to such an extent that said jaws 30a, 32a are located in a basic position at a basic angle 154a of 180 degrees between the sealing jaws 26a and 30a as well as 28a and 32a. The sealing jaws 26a and 28a form the transverse sealing seam 108a and separate the packages 110a. At this point in time, the sealing jaws 26a and 28a move again synchronously at the packaging speed 158a. In process step III, the sealing jaws 26a and 28a have completed producing the transverse sealing seam 108a, so that said jaws can now be accelerated. The sealing jaws 30a, 32a are now decelerated and synchronized with the packaging speed 158a for forming the next transverse sealing seam 108a. By suitably accelerating and/or decelerating the sealing jaws 26a, 28a, 30a, 32a of the respective sealing jaw pair 22a, 24a that is not currently sealing, varying package lengths 160a can be produced by the same horizontal transverse sealing unit 10a. This movement compensation is known to the person skilled in the art as a limping movement. By means of independent sealing drives 36a, 38a, the limping movement of a sealing jaw pair 22a, 24a, can be carried out independently of the further sealing jaw pair 22a, 24a, also, in particular, while one of the sealing jaw pairs 22a, 24a is currently sealing and is synchronized to the packaging speed 158a. A longer time window is thus available for the limping movement; thus enabling a maximum acceleration rate to be minimized.

A control unit 48a is provided for optimizing a speed profile of the limping movement. The control unit 48a actuates the sealing drives 36a, 38a such that said drives are initially uniformly accelerated after completing a sealing process of a sealing jaw pair 22a, 24a in order to then synchronize said drives again with the packaging speed 158a by means of a uniform acceleration in the opposite direction prior to the next sealing process of the sealing jaw pair 22a, 24a. If the path around which the sealing jaw pairs 22a, 24a are moved around the rotational axes 18a, 20a is longer than the package length 160a, said sealing jaw pairs 22a, 24a are initially accelerated and than decelerated again to packaging speed 158a. If the path around which the sealing jaw pairs 22a, 24a are moved around the rotational axis 18a, 20a is shorter than the packaging length 160a, said sealing jaw pairs 22a, 24a are decelerated and subsequently accelerated again to packaging speed 158a. The speed profiles for increasing as well as decelerating the speed of the sealing jaws 26a, 28a, 30a, 32a are ideally designed to be symmetrical. The control unit 48a optimizes the speed profiles, in particular, to the effect that the maximally required acceleration rates are minimal. In the middle of a sealing process of a sealing jaw pair 22a, 24a, the sealing jaw pairs then lie opposite each other at a basic angle 154a of 180 degrees.

The following description and the drawings of further exemplary embodiments are limited substantially to the differences between the exemplary embodiments, wherein, with regard to similarly denoted components, in particular with regard to components having identical reference signs, reference can generally be made to the drawings and/or the description of the other exemplary embodiment. In order to distinguish between the exemplary embodiments, instead of the letter "a" of the first exemplary embodiment, the letters "b", "c" and "d" are placed behind the reference signs of the further exemplary embodiments.

Figure 5:
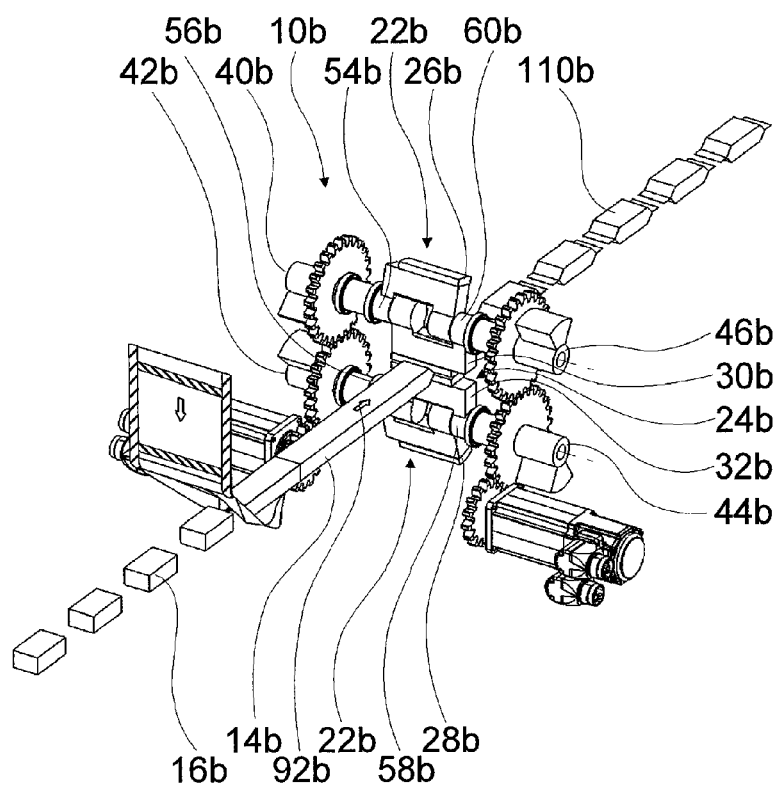
FIG. 5 shows a schematic depiction of parts of a horizontal transverse sealing unit in a second exemplary embodiment.

FIG. 5 shows a horizontal transverse sealing unit 10b in a second exemplary embodiment. The horizontal transverse sealing unit 10b is different from the preceding exemplary embodiment, in particular, by virtue of the fact that the sealing shafts 40b, 42b, 44b, 46b of sealing jaw pairs 22b, 24b each have a support region 54b, 56b, 58b, 60b on which a sealing jaw 26b, 28b, 30b, 32b of the further sealing jaw pair 22b, 24b having a common rotational axis 18b, 20b is supported. The support region 54b, 56b, 58b, 60b can, as shown in the exemplary embodiment, with the sealing jaws 26b, 28b, 30b, 32b constitute a slide bearing. It is, however, also conceivable that the support regions 54b, 56b, 58b, 60b are each designed as the outer ring of a ball-bearing in order to prevent friction between the sealing jaws 26b, 28b, 30b, 32b and the support regions 54b, 56b, 58b, 60b. In this case, the person skilled in the art will select a suitable design of the support regions 54b, 56b, 58b, 60b. A mounting of the sealing jaws 26b, 28b, 30b, 32b will thereby be stiffened and bending moments which are generated by a sealing pressure can be better absorbed. The horizontal transverse sealing unit 10b can optionally likewise be equipped with a support unit, as shown in the preceding exemplary embodiment.

Figure 6:
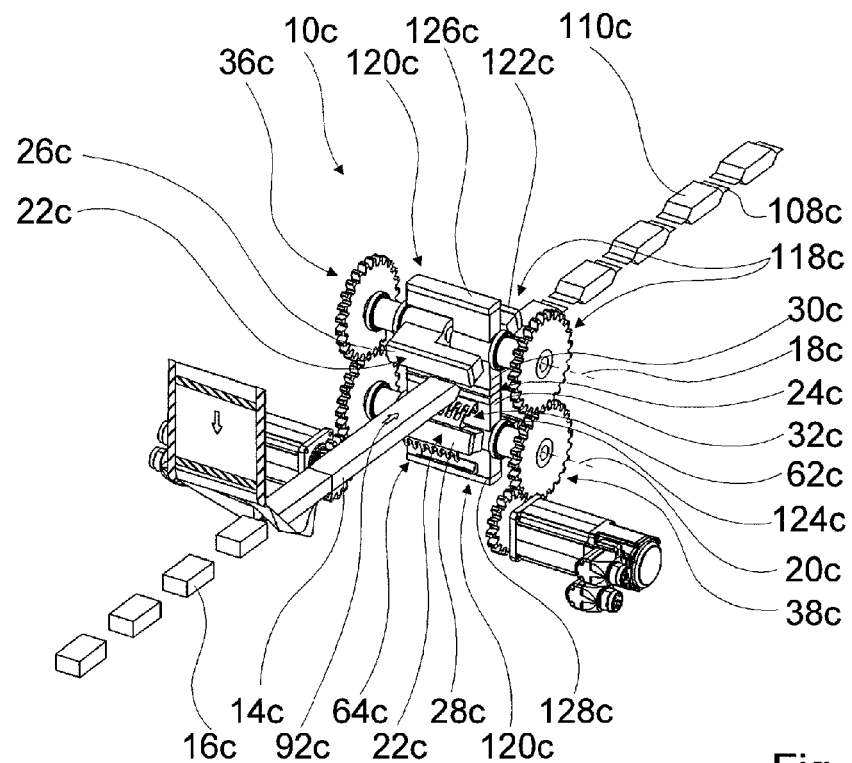
FIG. 6 shows a schematic depiction of parts of a horizontal transverse sealing unit in a third exemplary embodiment.

FIG. 6 shows a horizontal sealing unit 10c in a third exemplary embodiment. The horizontal sealing unit 10c differs from the first exemplary embodiment, in particular, by virtue of the fact that each of the two sealing drives 36c, 38c is provided to drive respectively two sealing jaw pairs 22c, 24c, 118c, 120c jointly and independently of the two further sealing jaw pairs 22c and 118c. The sealing drive 36c drives the sealing jaw pairs 22c and 118c, and the sealing drive 38c drives the sealing jaw pairs 24c and 120c. The first sealing jaw pair 22c comprises sealing jaws 26c and 28c. The second sealing jaw pair 24c comprises sealing jaws 30c and 32c. The third sealing jaw pair 118c comprises sealing jaws 122c and 124c. The fourth sealing jaw pair 120c comprises sealing jaws 126c and 128c. Thus, four sealing jaws 26c, 30c, 122c, 126c are disposed around a rotational axis 18c. The four sealing jaws 28c, 32c, 124c, 128c are disposed around the rotational axis 20c. If the sealing jaws 26c, 28c, 30c, 32c, 122c, 124c, 126c, 128c are uniformly distributed around the rotational axes 18c, 20c, adjacent sealing jaws 26c, 28c, 30c, 32c, 122c, 124c, 126c, 128c span in each case an angle of 90 degrees. Respectively two sealing jaws 26c and 122c, 30c and 126c, 28c and 124c, 32c and 128c are disposed on a common sealing shaft 40c, 42c, 44c, 46c. The sealing drives 36c, 38c thus each drive two sealing jaw pairs 22c, 118c and 24c, 120c jointly, but independently of the two other sealing jaw pairs 24c, 120c and 22c, 118c. The horizontal transverse sealing unit 10c of this exemplary embodiment is especially suited to the production of short packages 110c due to the double amount of sealing jaws 26c, 28c, 30c, 32c, 122c, 124c, 126c, 128c. Admissible adjustment angles are smaller than in the preceding example. As in the first exemplary embodiment, support units 62c, 64c are provided on the sealing jaws 28c, 32c, 124c, 128c, wherein two further support units in FIG. 6 are covered and not depicted.

Figure 7:
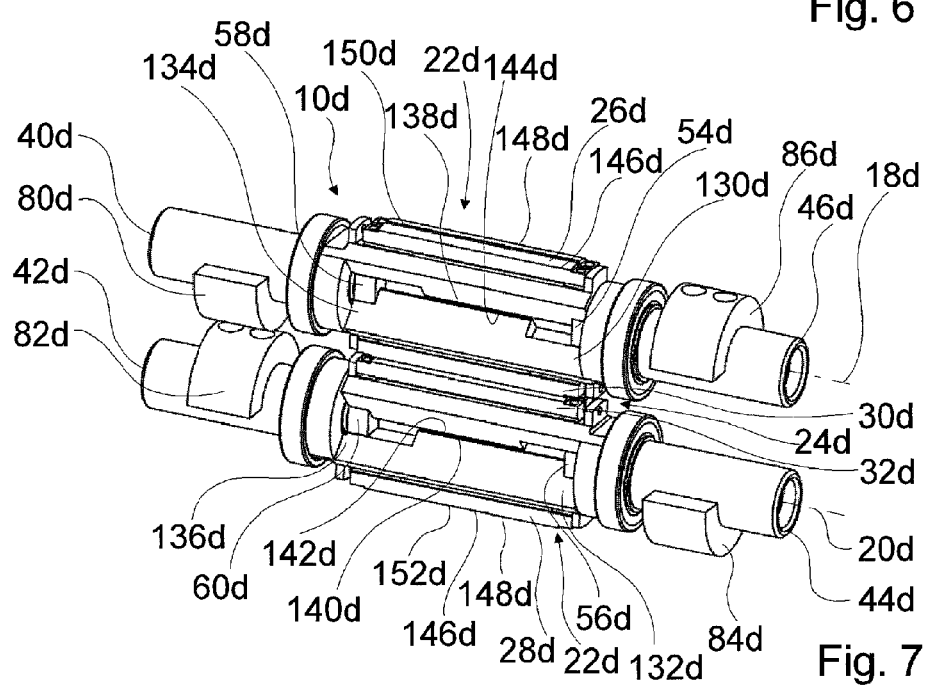
FIG. 7 shows a schematic depiction of parts of a horizontal sealing unit in a fourth exemplary embodiment.

FIG. 7 shows a horizontal transverse sealing unit 10d in a fourth exemplary embodiment. The horizontal transverse sealing unit 10d is different from the second exemplary embodiment, in particular, by virtue of the fact that sealing jaws 26d, 28d, 30d, 32d and end regions 130d, 132d, 134d, 136d are disposed on sealing shafts 40d, 42d, 44d, 46d. In order to prevent a deflection of the sealing jaws 26d, 28d, 30d, 32d, said jaws are supported on support regions 54d, 56d, 58d, 60d of the sealing shafts 40d, 42d, 44d, 46d. As depicted in this example, support regions 138d, 140d, 142d, 144d lying opposite one another can additionally be disposed on the sealing jaws 26d, 28d, 30d, 32d along the rotational axes 18d, 20d, on which support regions the sealing jaws 26d and 30d as well as 28d and 32d, which lie opposite one another, are mutually supported. The horizontal transverse sealing unit 10d of the fourth exemplary embodiment can be especially compact and have a small diameter. The horizontal transverse sealing unit 10d is particularly suited to the production of short packages 110d and for an operation with a high rotational speed. The sealing jaws 26d, 28d, 30d, 32d have in each case two sealing faces 146d, 148d, between which, in the case of sealing jaws 26d, 30d, a blade 150d is disposed. In the case of sealing jaws 28d, 32d, a counter holder 152d is situated between the sealing faces 146d, 148d. A tubular film 14d is severed under pressure between blade 150d and counter holder 152d, so that packages 110d can be separated. Transverse sealing seams 108d of the packages 110d are formed in each case between the sealing faces 146d and 148d upstream and downstream of the separation point. This design of the sealing faces 146d, 148d and blade 150d with counter holder 152d corresponds to the design of the further exemplary embodiments which are not depicted in detail.

The invention claimed is:

1. A horizontal transverse sealing unit, having a first rotational axis and a second rotational axis (18a-d, 20a-d) which are parallel to each other and at least two sealing jaw pairs (22a-d, 24a-d, 118c, 120c) which are each formed by at least one sealing jaw (26a-d, 30a-d, 122c, 126c) rotating around the first rotational axis (18a-d) and at least one sealing jaw (28a-d, 32a-d, 124c, 128c) rotating around the second rotational axis (20a-d), such that, during a sealing process, the sealing jaws (26a-d, 28a-d, 30a-d, 32a-d, 122c, 124c, 126c, 128c) of a sealing jaw pair (22a-d, 24a-d, 118c, 120c) approach each other and material layers (34a-d) can be sealed between the sealing jaws (26a-d, 28a-d, 30a-d, 32a-d, 122c, 124c, 126c, 128c) under exertion of pressure, characterized by at least two independently drivable sealing drives (36a-d, 38a-d) which are provided to drive at least two sealing jaw pairs (22a-d, 24a-d, 118c, 120c) independently of each other, wherein the sealing unit further includes at least one support unit (62a, 64a) that rotates about the second rotational axis (20a) and is configured to, at least in part, bridge a gap (66a, 68a) between two of the sealing jaws (28a, 32a) that rotate about the second rotational axis (20a).

2. The horizontal transverse sealing unit according to claim 1, characterized in that the sealing drives (36a-d, 38a-d) each have a sealing shaft (40a-d, 42a-d, 44a-d, 46a-d) that rotates around the first rotational axis (18*a-d*) and a sealing shaft (40*a-d*, 42*a-d*, 44*a-d*, 46*a-d*) that rotates around the second rotational axis (20*a-d*), on which sealing shafts in each case at least one sealing jaw (26*a-d*, 28*a-d*, 30*a-d*, 32*a-d*, 122*c*, 124*c*, 126*c*, 128*c*) of at least one sealing jaw pair (22*a-d*, 24*a-d*, 118*c*, 120*c*) is disposed.

3. The horizontal transverse sealing unit according to claim 1, characterized by a control unit (48*a-d*) configured to optimize a movement profile of the sealing drives (36*a-d*, 38*a-d*).

4. The horizontal sealing unit according to claim 1, characterized in that two sealing drives (36*a-d*, 38*a-d*) are disposed opposite to each other in a direction of the first and second rotational axes (18*a-d*, 20*a-d*).

5. The horizontal transverse sealing unit according to claim 2, characterized by at least one support shaft (50*a*, 52*a*) with which sealing shafts (40*a*, 42*a*, 44*a*, 46*a*) having a common rotational axis (18*a*, 20*a*) are mutually supported.

6. The horizontal transverse sealing unit according to claim 2, characterized in that at least one sealing shaft (40*bd*, 42*bd*, 44*bd*, 46*bd*) of a sealing jaw pair (22*bd*, 24*bd*) has at least one support region (54*bd*, 56*bd*, 58*bd*, 60*bd*) on which at least one sealing jaw (26*bd*, 28*bd*, 30*bd*, 32*bd*) of a further sealing jaw pair (22*bd*, 24*bd*) having a common rotational axis (18*bd*, 20*bd*) is supported.

7. The horizontal transverse sealing unit according to claim 1, characterized in that the support unit (62*a*, 64*a*) comprises at least two support combs (72*a*, 74*a*, 76*a*, 78*a*) which mesh with one another and are mounted on sealing jaws (28*a*, 32*a*) that are adjacent one another along a rotational direction (70*a*) that extends around the second axis (20*a*).

8. The horizontal transverse sealing unit according to claim 1, characterized by at least one counterweight (80*abd*, 82*abd*, 84*abd*, 86*abd*) which, at least in part, compensates for centrifugal forces of a sealing jaw (26*abd*, 28*abd*, 30*abd*, 32*abd*) disposed on a sealing shaft (40*abd*, 42*abd*, 44*abd*, 46*abd*).

9. A horizontal tubular bag machine comprising a horizontal transverse sealing unit (10*a-d*) according to claim 1.

10. The horizontal tubular bag machine according to claim 9, characterized in that the sealing drives (36*a-d*, 38*a-d*) each have a sealing shaft (40*a-d*, 42*a-d*, 44*a-d*, 46*a-d*) that rotates around the first rotational axis (18*a-d*) and a sealing shaft (40*a-d*, 42*a-d*, 44*a-d*, 46*a-d*) that rotates around the second rotational axis (20*a-d*), on which sealing shafts in each case at least one sealing jaw (26*a-d*, 28*a-d*, 30*a-d*, 32*a-d*, 122*c*, 124*c*, 126*c*, 128*c*) of at least one sealing jaw pair (22*a-d*, 24*a-d*, 118*c*, 120*c*) is disposed.

11. The horizontal tubular bag machine according to claim 9, characterized by a control unit (48*a-d*) configured to optimize a movement profile of the sealing drives (36*a-d*, 38*a-d*).

12. The horizontal sealing unit according to claim 9, characterized in that two sealing drives (36*a-d*, 38*a-d*) are disposed opposite to each other in a direction of the first and second rotational axes (18*a-d*, 20*a-d*).

13. The horizontal tubular bag machine according to claim 10, characterized by at least one support shaft (50*a*, 52*a*) with which sealing shafts (40*a*, 42*a*, 44*a*, 46*a*) having a common rotational axis (18*a*, 20*a*) are mutually supported.

14. The horizontal tubular bag machine according to claim 10, characterized in that at least one sealing shaft (40*bd*, 42*bd*, 44*bd*, 46*bd*) of a sealing jaw pair (22*bd*, 24*bd*) has at least one support region (54*bd*, 56*bd*, 58*bd*, 60*bd*) on which at least one sealing jaw (26*bd*, 28*bd*, 30*bd*, 32*bd*) of a further sealing jaw pair (22*bd*, 24*bd*) having a common rotational axis (18*bd*, 20*bd*) is supported.

15. The horizontal tubular bag machine according to claim 9, characterized by at least one counterweight (80*abd*, 82*abd*, 84*abd*, 86*abd*) which, at least in part, compensates for centrifugal forces of a sealing jaw (26*abd*, 28*abd*, 30*abd*, 32*abd*) disposed on a sealing shaft (40*abd*, 42*abd*, 44*abd*, 46*abd*).

16. The horizontal transverse sealing unit according to claim 1, wherein two separate support units (62*a*, 64*a*) are coupled to one of the sealing jaws (26*a-d*, 28*a-d*, 30*a-d*, 32*a-d*, 122*c*, 124*c*, 126*c*, 128*c*), one support unit (62*a*, 64*a*) each being disposed on either side of the sealing jaw (26*a-d*, 28*a-d*, 30*a-d*, 32*a-d*, 122*c*, 124*c*, 126*c*, 128*c*).

\* \* \* \* \*